United States Patent
Yan et al.

(10) Patent No.: US 8,897,104 B1
(45) Date of Patent: Nov. 25, 2014

(54) METHOD AND SYSTEM FOR PERFORMING OFF-DISK MEASUREMENTS OF LASER-INDUCED NFT PROTRUSION IN A HEAT ASSISTED MAGNETIC RECORDING TRANSDUCER

(71) Applicant: Western Digital (Fremont), LLC, Fremont, CA (US)

(72) Inventors: Wentao Yan, Fremont, CA (US); Yu Lo, Foster City, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/895,357

(22) Filed: May 16, 2013

Related U.S. Application Data (60) Provisional application No. 61/807,552, filed on Apr. 2, 2013.

(51) Int. Cl.
*G11B 11/00* (2006.01)
*G11B 20/18* (2006.01)

(52) U.S. Cl.
CPC .................................. *G11B 20/1816* (2013.01)
USPC ................. 369/13.33; 369/13.13; 369/112.27

(58) Field of Classification Search
CPC .................. G11B 13/08; G11B 5/607; G11B 2005/0021; G11B 5/3133; G11B 5/314; G11B 5/6088
USPC .......... 369/13.33, 13.32, 13.24, 13.14, 13.03, 369/13.02, 13.12, 13.13, 112.27
See application file for complete search history.

(56) References Cited

U.S. PATENT DOCUMENTS

| | | | |
|---|---|---|---|
| 4,913,547 A | 4/1990 | Moran | |
| 5,805,284 A | 9/1998 | Lacey | |
| 5,949,546 A | 9/1999 | Lee et al. | |
| 6,950,267 B1 | 9/2005 | Liu et al. | |
| 7,027,242 B1 | 4/2006 | Terrill et al. | |
| 7,542,246 B1 | 6/2009 | Song et al. | |
| 7,573,682 B2 | 8/2009 | Pust et al. | |
| 8,456,643 B2 | 6/2013 | Prabhakaran et al. | |
| 8,514,673 B1 * | 8/2013 | Zhao et al. | 369/13.33 |
| 8,526,274 B2 * | 9/2013 | Naniwa et al. | 369/13.33 |
| 8,565,049 B1 * | 10/2013 | Tanner et al. | 369/13.33 |
| 2004/0141186 A1 | 7/2004 | Hu et al. | |
| 2005/0165561 A1 | 7/2005 | Zeng | |

(Continued)

OTHER PUBLICATIONS

Vladimir Nikitin, et al., "Spatial and Temporal Profiling of Protrusion in Magnetic Recording Heads", IEEE Transactions on Magnetics, vol. 40, No. 1, Jan. 2004, pp. 326-331.

(Continued)

*Primary Examiner* — Ali Neyzari (57) ABSTRACT

A method and system test a heat assisted magnetic recording (HAMR) transducer. The HAMR transducer is optically coupled to at least one laser and has an air-bearing surface. The HAMR transducer includes at least one waveguide, at least one near-field transducer (NFT) and a pole. A portion of the NFT(s) resides at the ABS. The laser(s) are optically coupled to the NFT(s). The method and system include energizing the laser(s) at power(s) while the HAMR transducer is not in proximity to a media. The method and system also include measuring an off-disk protrusion of the portion of the NFT(s) at the ABS while the laser(s) are energized and the HAMR transducer is not in proximity to the media.

16 Claims, 4 Drawing Sheets

(56) References Cited

U.S. PATENT DOCUMENTS

| | | |
|---|---|---|
| 2006/0103959 A1 | 5/2006 | Lu |
| 2008/0080086 A1 | 4/2008 | Che et al. |
| 2008/0198510 A1 | 8/2008 | Sugimoto et al. |
| 2008/0225427 A1 | 9/2008 | Liu |
| 2009/0113464 A1 | 4/2009 | Gage et al. |
| 2009/0268335 A1 | 10/2009 | Huang et al. |
| 2011/0286129 A1 | 11/2011 | Prabhakaran et al. |
| 2013/0286802 A1* | 10/2013 | Kiely ............... 369/13.31 |
| 2013/0286805 A1* | 10/2013 | Macken et al. ........ 369/13.33 |
| 2013/0286807 A1* | 10/2013 | Gao et al. ............. 369/13.33 |
| 2014/0029396 A1* | 1/2014 | Rausch et al. ......... 369/13.23 |
| 2014/0036646 A1* | 2/2014 | Peng et al. ........... 369/13.33 |

OTHER PUBLICATIONS

M. Kurita, et al., "Optical Measurement of Flying-Height Change Due to Thermal Protrusion of Magnetic Head", Asia-Pacific Magnetic Recording Conference—2006, Publication Date: Nov. 29, 2006-Dec. 1, 2006, 1 page.

Junguo Xu, et al., "Thermal Analysis of a Magnetic Head", IEEE Transactions on Magnetics, vol. 40, No. 4, Jul. 2004, pp. 3142-3144.

M. Kurita, et al., "Flying-Height Reduction of Magnetic Head Slider Due to Thermal Protrusion", Magnetics Conference 2005, INTERMAG Asia 2005, Digests of the IEEE International, Publication Year: 2005 , pp. 1401-1402.

Junguo Xu, et al., "High-Resolution Measurement of Temperature Distribution in Head Coil and Air Bearing Surface", IEEE Transactions on Magnetics, vol. 39, No. 5, Sep. 2003, pp. 2411-2413.

\* cited by examiner

METHOD AND SYSTEM FOR PERFORMING OFF-DISK MEASUREMENTS OF LASER-INDUCED NFT PROTRUSION IN A HEAT ASSISTED MAGNETIC RECORDING TRANSDUCER

CROSS-REFERENCE TO RELATED APPLICATIONS

This application claims priority to provisional U.S. Patent Application Ser. No. 61/807,552, filed on Apr. 2, 2013, which is hereby incorporated by reference in its entirety.

BACKGROUND

Heat assisted magnetic recording (HAMR) disk drives typically include a HAMR head, a laser, and a magnetic recording media. The HAMR disk drive utilizes heat, typically in the form of laser light, to heat a region of the magnetic recording media. The HAMR head magnetically writes data to the media. More specifically, the HAMR head includes a slider and a HAMR write transducer on the slider. The HAMR head may also include a reader. The HAMR transducer includes optics, such as a waveguide, for directing light toward the air-bearing surface (ABS) as well as magnetic components for writing to the media. Because the media is heated, the media is more disordered, allowing for writing at a lower magnetic field.

In order provide the laser light to the media, the laser is typically optically coupled to the waveguide of the HAMR transducer. The waveguide is optically coupled to a near-field transducer (NFT) that is also a component of the HAMR transducer. A portion of the NFT resides at the ABS of the HAMR transducer. The NFT utilizes resonances in surface plasmons to couple light to the media. The magnetic components, such as coil(s) and pole(s), may then be used to write to a portion of the media heated by the NFT.

Although the conventional HAMR disk drive functions, various components of the HAMR disk drive may fail during operation. For example, the NFT and surrounding components may undergo thermal cycling. During operation, portions of the HAMR transducer may also be heated to temperatures significantly above ambient temperature. Such issues may adversely affect performance of the HAMR disk drive. Consequently, methods for testing the HAMR disk drive are desired.

DETAILED DESCRIPTION OF THE EXEMPLARY EMBODIMENTS

Figure 1:
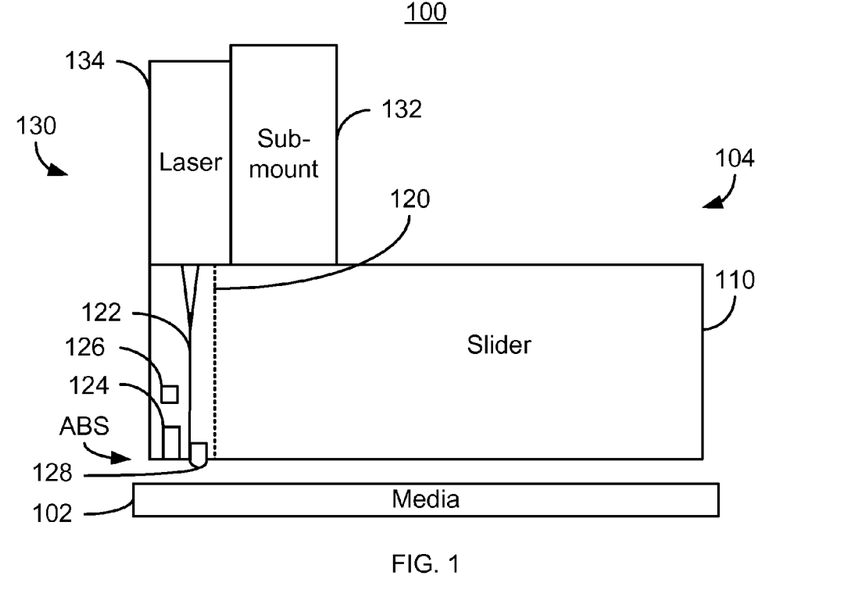
FIG. 1 depicts a side view of a HAMR disk drive.

FIG. 1 depicts a side view of an exemplary embodiment of a portion of a HAMR disk drive 100. For clarity, FIG. 1 is not to scale. For simplicity not all portions of the HAMR disk drive 100 are shown. In addition, although the HAMR disk drive 100 is depicted in the context of particular components other and/or different components may be used. For example, circuitry used to drive and control various portions of the HAMR disk drive 100 is not shown. For simplicity, only single components 102, 110, 120, 130 and 140 are shown. However, multiples of each components 102, 104, 110, 120, 130 and/or 140 and their sub-components, might be used.

The HAMR disk drive 100 includes media 102 and a HAMR head 104. The HAMR head 104 includes a slider 110, a HAMR transducer 120, and a laser assembly 130. Additional and/or different components may be included in the HAMR disk drive 100. Although not shown, the slider 110, and thus the laser assembly 130 and HAMR transducer 120 are generally attached to a suspension (not shown). The laser assembly 130 includes a submount 132 and a laser 134. The submount 132 is a substrate to which the laser 134 may be affixed for improved mechanical stability, ease of manufacturing and better robustness. The laser 134 may be a chip such as a laser diode.

The HAMR transducer 120 is fabricated on the slider 110 and includes an air-bearing surface (ABS) proximate to the media 102 during use. In general, the HAMR disk drive 100 includes a write transducer 120 and a read transducer (not shown). However, for clarity, only the write portion of the HAMR head 104 is shown. The HAMR transducer 120 includes a waveguide 122, write pole 124, coil(s) 126 and near-field transducer (NFT) 128. In other embodiments, different and/or additional components may be used in the HAMR head 104. The waveguide 122 guides light to the NFT 128, a portion of which resides near the ABS. Typically, the NFT includes a disk portion recessed from the ABS and a pin portion having a surface at the ABS. The pin portion of the NFT is on the order of 30-50 nanometers, while the disk portion has a diameter on the order of 200 nm. The NFT 128 utilizes local resonances in surface plasmons to focus the light to magnetic recording media 102. At resonance, the NFT 128 couples the optical energy of the surface plasmons efficiently into the recording medium layer of the media 102 with a confined optical spot which is much smaller than the optical diffraction limit. This optical spot can rapidly heat the recording medium layer to near or above the Curie point. High density bits can be written on a high coercivity medium with the pole 124 energized by the coils 126 to a modest magnetic field.

During operation, the NFT 128 may undergo significant heating. As a result, the NFT 128 may protrude from the ABS, as shown in FIG. 1. This protrusion may cause the NFT 128 to contact the disk 102. In addition, thermal cycling may cause the NFT 128 to undergo plastic deformation. For plastic deformation, the NFT 128 may not return to its original state because a portion of the NFT 128 remains deformed after the temperature of the NFT 128 is reduced to room temperature. Thus, as discussed above, the NFT 128 is desired to be tested.

Recently developed methods for testing the NFT 128 may involve testing the NFT 128 in situ (in the disk drive 100). It has been generally believed that cooling at the ABS due to the motion of the media 102 and other factors are a significant component in determining the temperature of, for example, the NFT 128. Stated differently, a perception exists that the protrusion of the NFT 128 may only be accurately measured when the head 104 is flying over the disk 102. Thus, methods for measuring the deformation of the NFT 128 often involve optical or other measurements that can be performed in the presence of the disk 102. For example, a scanning Laser Doppler Vibrometer (LDV) may be used to shine a measuring laser through a transparent disk to the areas of interest on the head 120. However, the spot size of the laser is on the order of one micron, which is significantly larger than the width of the NFT 128. The resultant may be the average protrusion over the spot, which falls short of accurately measuring the protrusion of NFT 128. Thus, such recently developed methods for measuring the deformation of the NFT 128 may be unreliable and difficult to perform. Consequently, a better mechanism for testing the deformation of the NFT 128 and predicting the deformation of the NFT 128 under operating conditions are desired.

Figure 2:
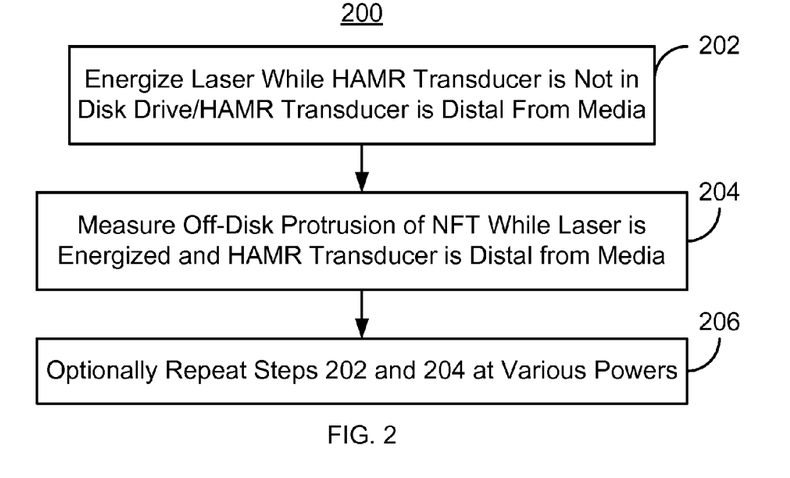
FIG. 2 is a flow chart depicting an exemplary embodiment of a method for testing the protrusion of the NFT of a HAMR head.
Figure 3:
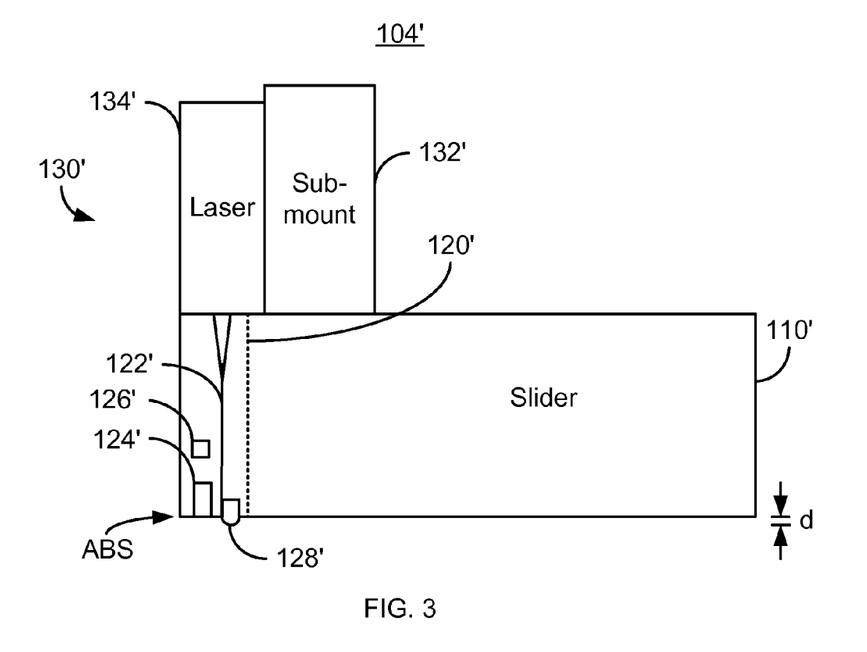
FIG. 3 is a diagram depicting a side view of an exemplary embodiment of a HAMR head.

FIG. 2 is a flow chart depicting an exemplary embodiment of a method 200 for testing a HAMR transducer. For simplicity, some steps may be omitted, combined, replaced, performed in another sequence, and/or interleaved. FIG. 3 depicts an exemplary embodiment of a HAMR head 104' with which the method 200 may be used. The method 200 is thus described in the context of the HAMR transducer 120' and HAMR head 104'. The HAMR head 104' is analogous to the HAMR head 104 and thus includes analogous components having similar labels as the HAMR head 104. Thus, the HAMR head 104' includes a laser subassembly 130' having a laser 134' and submount 132', a slider 110' and a HAMR transducer 120'. The HAMR transducer 120' includes at least a waveguide 122', a write pole 124', coil(s) 126' and NFT 128' that are analogous to the waveguide 122, write pole 124, coil(s) 126 and NFT 128, respectively. The HAMR head 104' may include additional and/or other components. However, it is noted that the media 102 present in the disk drive 100 is not depicted in FIG. 3. This is because the media is not part of the HAMR head 104'. Although the ABS is indicated in FIG. 3, this refers to the surface at which the ABS would be formed if the HAMR head 104' was in a disk drive.

Referring to FIGS. 2 and 3, the HAMR transducer 120' being tested may be part of a HAMR head 104' that includes the laser 134'. In other embodiments, the HAMR transducer 120' being tested may be separated from the laser 134'. However, the method 200 may be used for other HAMR transducers. The method 200 is also described in the context of testing a single transducer 120'. However, the method 200 may be used to test multiple transducers at substantially the same time.

The laser 134' is energized with a particular power while the HAMR transducer 120' is not in proximity to a media, via step 202. More specifically, the HAMR head 104' may be tested when the HAMR head 104' is not in a disk drive. Thus, any cooling due to a media or other aspects of the disk drive is not present in the method 200. In some embodiments, the power that is used in step 202 is the operating power that would be used if the HAMR head 104' were being used in a HAMR disk drive. However, other power may also be used.

An off-disk protrusion of the portion the NFT 128' at the ABS is measured, via step 204. This measurement is performed while the laser 134' is energized and while the HAMR transducer 120' is not in proximity to the media. Thus, the protrusion, d, of the NFT 128' may be determined. In some embodiments, the determination of the protrusion, d, in step 204 may include subtracting a baseline location of the NFT 128' measured while the laser 134' is not powered on from the location of the NFT 128' measured while the laser 134' is energized. In some embodiments, step 204 includes measuring the protrusion of the NFT 128' with respect to another location, such as the location of the waveguide 122' and pole 124' at the ABS. This is because although it is shown as flat in FIG. 3, the ABS may not be completely flat at the level of the protrusion of the NFT 128'. Step 204 may include utilizing an atomic force microscope (AFM) or other measurement tool that is capable of sufficient accuracy in the range of the protrusion. For example, the protrusion may be on the order of a few nanometers or less. In some cases, the protrusion may be less than a nanometer. The measurement tool used in step 104 is desired to be capable of measuring changes in depth/height at such lengths. In some embodiments, therefore, profilometry may be used. In other embodiments, optical or other measurements mechanisms may be used. In addition, the measurement should be sufficiently accurate to determine the protrusion of the NFT 128'. The NFT 128' may have a width on the order of 20-50 nanometers or less at the ABS. Thus, the measurement tool should have a spatial resolution (substantially in the plane of the ABS) to measure the protrusion at the NFT 128'. In some cases, the spatial resolution of an AFM may be significantly less than the size of the NFT. Thus, an AFM may be used in step 204. In at least some embodiments, special probes may be used in the AFM to prevent probe melting.

Steps 202 and 204 may optionally be repeated for various powers, via step 206. Step 206 may include reducing the power to the laser 134' to zero and measuring the protrusion of the NFT 128' at zero laser power. In a subsequent iteration, the laser 134' may be energized again. In such an embodiment, the laser power may be reduced to zero and the protrusion measured in alternate iterations of steps 202 and 204. Thus, a baseline location of the NFT 128' may be determined for zero laser power. This may allow a determination of whether the NFT 128' has undergone plastic deformation at the previous power used.

Thus, using the method 200, the protrusion of the NFT 128' at various powers may be determined for the case in which the NFT 128' is not in proximity to a moving media. The method 200 may be more simply and accurately performed. More specifically, cooling due to a disk, such as the media 102 depicted in FIG. 1, is not present during testing using the method 200. However, it has been determined that the measurement of the protrusion of the NFT 128' may be sufficiently accurate. This result is in contrast to previously accepted assumptions regarding NFT performance. It is believed that the relatively small part of the pin portion of the NFT 128' subject to cooling at the ABS may not be sufficient to cool the NFT 128'. As a result, the measurement performed using the method 200 may be sufficiently accurate. In addition the presence of the moving media 102 may also be accounted for. For example, the method 200 may include applying modeling to the measured/determined protrusion, d. It has been determined that the actual protrusion (in disk/in situ for the NFT 120 in the disk drive 100) may be sufficiently close to the measured protrusion (for the NFT 128' without the media). For example, in some cases the protrusion, d, has been determined to be on the order of one nanometer using the method 200. The actual protrusion may be somewhat less than one nanometer, for example on the order of 0.75 nanometer. Thus, although the difference is a significant fraction of the actual protrusion, the actual difference, on the order of 0.25 nanometer, may be relatively negligible for analysis of performance of the HAMR transducer 120'. The difference is also such that the protrusion determined using the method 200 is larger than the actual protrusion. Thus, any error introduced by the use of the protrusion determined in method 200 may not cause the HAMR head 104 to contact the disk 102 and induce failure in the NFT 128. Further, as discussed above, the difference may be accounted for using modeling. As a result, testers may be better able to determine the response of the NFTs 128'/128 for various laser powers and, more particularly, at operating power. The results may be used to calibrate design parameters, material properties for the NFT and other criteria used for the HAMR disk drive 100. Thus, not only may the method 200 be easier to perform and result in more accurate measurements, but the method 200 may also be used in improving performance of the actual HAMR disk drive 100. In addition, because the HAMR transducer 120' is not in a disk drive, the method 200 may be performed on a bar level for the wafer on which the HAMR transducer 120' are fabricated. Therefore, multiple HAMR transducers 120' may be more rapidly and easily tested. This may also allow the method 200 to be used in fabrication screening of HAMR transducers 120'.

Figure 4:
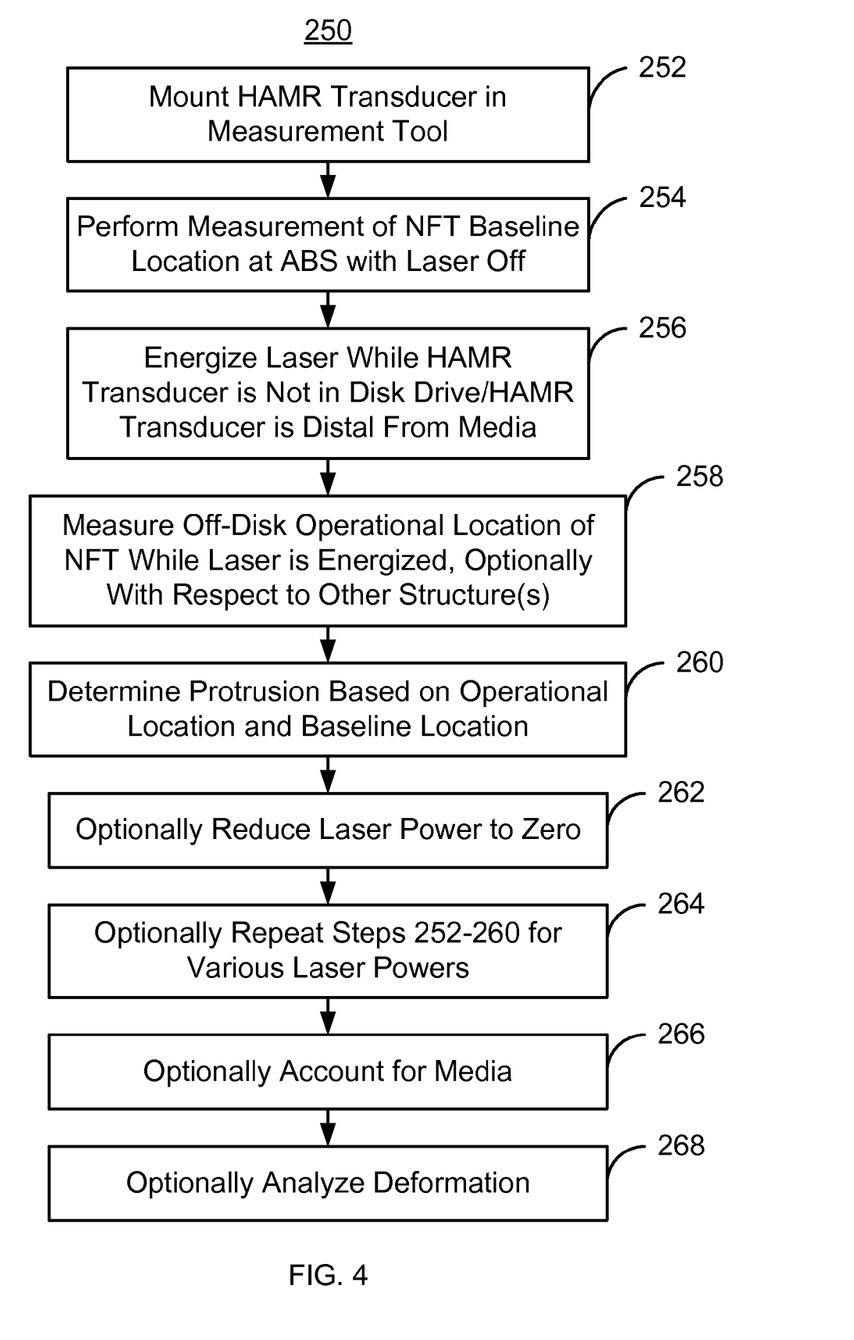
FIG. 4 is a flow chart depicting another exemplary embodiment of a method for testing the protrusion of the NFT of a HAMR head.
Figure 5:
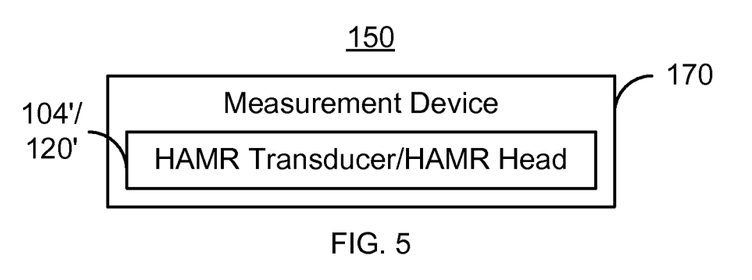
FIG. 5 is a diagram depicting an exemplary embodiment of a system for testing a HAMR head.

FIG. 4 is a flow chart depicting an exemplary embodiment of a method 250 for testing a HAMR transducer. For simplicity, some steps may be omitted, combined, replaced, performed in another sequence, and/or interleaved. FIG. 5 depicts a block diagram of a system 150 for testing the protrusion of an NFT in a HAMR transducer. The method 250 is described in the context of the HAMR transducer 120' and HAMR head 104' depicted in FIG. 3 as well as the system 150 depicted in FIG. 5.

Referring to FIGS. 3-5, the HAMR transducer 120' being tested may be part of a HAMR head 104' that includes the laser 134'. In other embodiments, the HAMR transducer 120' being tested may be separated from the laser 134'. However, the method 250 may be used for other HAMR transducers. The method 200 is also described in the context of testing a single transducer 120'. However, the method 200 may be used to test multiple transducers at substantially the same time.

The HAMR transducer 120' is mounted in a measurement device, via step 252. Step 252 may include placing the HAMR transducer 120' in the sample or other holder of a tool such as an AFM. Step 252 may also include connecting the transducer 120' to a laser if the HAMR transducer 120' is not already assembled with the laser 134'. In other embodiments, step 252 may include connecting the laser 134' to a power source. The ensuing discussion assumes that the laser 134' and HAMR transducer 120' are connected, for example in the HAMR head 104'. However such a connection between the HAMR transducer 120' and the laser used is not required. The measurement tool in which the NFT is mounted in step 252 is capable of sufficient accuracy in the range of the protrusion (perpendicular to the ABS) as well as sufficient spatial resolution (in the ABS "plane") that an accurate determination of the position of the NFT and the amount of the protrusion may be determined. Thus, an AFM may be used in the method 250. However, in other embodiments, other measurement apparatus may be used.

Figure 6:
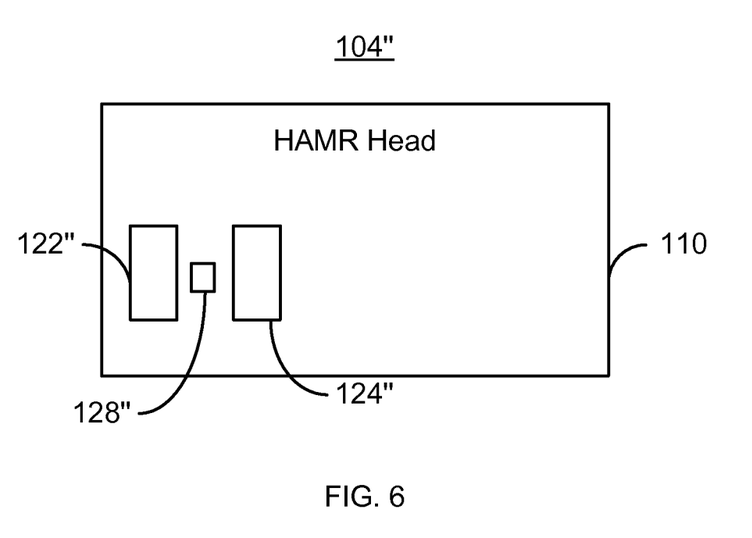
FIG. 6 is a diagram depicting an ABS view of an exemplary embodiment of a HAMR head.

A measurement of a baseline location of the portion of the NFT 128' at the ABS is taken, via step 254. This measurement is performed while the laser 134' is not energized. Step 254 is performed using the measurement tool. For example, if an AFM is used, then step 254 may include measuring a location of a structure near the NFT, such as the waveguide 122' and/or the pole 124' with respect to some location that is not expected to be heated by the laser, then measuring a location of the NFT 128' with respect to the structure. For example, FIG. 6 depicts an ABS view of the HAMR head 100". The HAMR head 104" is analogous to the HAMR heads 104 and 104'. Thus, the waveguide 122", write pole 124''' and NFT 128" analogous to the waveguide 122/122', write pole 124/124' and NFT 128/128' are shown. Referring to FIGS. 3-6, the protrusion of the NFT 128" (e.g. d in FIG. 3) may be determined with respect to the waveguide 122/122'/122" and/or the write pole 128/128'/128". The difference between the two measurements indicates the baseline location of the portion of the NFT 128' at the ABS.

The laser 134' is energized with a particular power while the HAMR transducer 120' is not in proximity to a media and is mounted in the measurement tool, via step 256. The HAMR head 104' is thus tested when the HAMR head 104' is not in a disk drive. Thus, any cooling due to a media or other aspects of the disk drive is not present in the method 250. In some embodiments, the power that is used in step 256 is the operating power that would be used if the HAMR transducer 104' were being operated in a HAMR disk drive. However, in other embodiments, the HAMR transducer 104' is desired to be tested over a range of laser powers. In such embodiments, the power used in step 256 is a power in this range.

An off-disk operational location of the portion the NFT 128' at the ABS is measured, via step 258. This measurement is performed while the laser 134' is energized, while the HAMR transducer 120' is not in proximity to the media and using the measurement apparatus such as an AFM. In some embodiments, the operational location is measured in a manner analogous to the baseline location. For example, if an AFM is used, then step 258 may include measuring a location of a structure near the NFT, such as the waveguide 122'/122" and/or the pole 124'/124" with respect to some location that is not expected to be heated by the laser, then measuring an operational location of the NFT 128'/128" with respect to the structure. Thus, the measurements of the NFT's location are taken with respect to a position that is not expected to protrude because of heating. The difference between the baseline and operational two measurements taken in steps 258 and 254 indicates the operational location of the portion of the NFT 128' at the ABS.

The protrusion of the NFT 128' is determined based on the baseline location and the operational location, via step 260. In some embodiments, the protrusion of the NFT 128' is determined by subtracting the baseline location from the operational location. The baseline location of the NFT 128' may be considered the protrusion of the NFT 128' from step 254 with respect to the waveguide or pole plus the protrusion of the waveguide/pole from step 254 with respect to the far off location. The operational location of the NFT 128' is the protrusion of the NFT 128' from step 258 with respect to the waveguide/pole plus the protrusion of the waveguide/pole with respect to the far off location from step 258. The difference between these two locations is the protrusion of the NFT 128' during operation. This indicates the amount that the NFT 128' has protruded from its previous location at the ABS at the power set in step 256. Thus, the protrusion, d, of the NFT 128' may be determined. In some embodiments, step 260 may not be repeated for every iteration of the method. For example, step 260 may be performed for the iteration(s) after all of the data are taken at various laser powers for the NFT 128'.

In some embodiments, the laser power is optionally reduced to zero, via step 262. Step 262 may be used if it is desired to determine whether the NFT 128' returns to its initial position after being cooled. Alternatively, step 262 may be omitted.

One or more of steps 254-262 may optionally be repeated for various laser powers, via step 264. For example, step 254, measurement of the baseline location may be repeated. Step 262 may be repeated if the user desires to determine whether the NFT 128' returns to its baseline position after it is cooled. Reducing the laser power to zero and taking another measurement of the location while the laser power is at zero allows a comparison of the baseline positions to be made. Thus, it may be determined whether the NFT 128' has returned to its initial position. If not, then plastic deformation may have occurred. The laser power at which plastic deformation occurs may thus be determined. Alternatively, step 262 may be repeated simply to improve the accuracy of the measurement of the protrusion of the NFT 128'. Step 256 may be repeated by energizing the laser at various power(s). These power(s) may include but are not limited to the operational power used for the laser. The off-disk measurement may then be performed at the new laser power and using the measurement tool in step 258. The protrusion at the new power may then be determined based on the new operational location and the new baseline location using step 260. The power may then be reduced to zero for another baseline measurement or simply changed to another value if step 256 is repeated. Subsequent iterations of steps 254, 256, 258, 260 and 262 are performed in substantially the same manner as the first iteration except that the laser power may be changed. As such, the behavior of the NFT may be investigated.

The media may optionally be accounted for, via step 266. This step may include modeling the on-disk (i.e. in disk drive) operation of the HAMR transducer 120'. However, in other embodiments, the protrusion of the NFT determined in step(s) 260 may be used as the actual value of the protrusion. The deformation may optionally be analyzed, via step 268. Step 268 may be performed by comparing the baseline locations measured in iterations of step 254. If the baseline locations are substantially the same, the NFT 128' has undergone elastic deformation. If, however, the baseline locations are substantially different, then the NFT 128' has undergone plastic deformation. For example, if the baseline location differs from the initial baseline location measured in the first iteration of step 254 by an amount that is greater than the noise level of the measurement, then the NFT 128' has undergone plastic deformation. The laser power set in step 254 of the iteration for which step 262 is performed is the laser power that has heated the NFT 128' sufficiently for the NFT 128' to deform plastically. Thus, the laser power at which the NFT 128' may be subject to plastic deformation may be determined.

Thus, using the method 250, the protrusion of the NFT 128' at various powers may be determined for the case in which the NFT 128' is not in proximity to a moving media. The method 250 may be more simply and accurately performed. The presence of the moving media 102 may also be accounted for, for example, via modeling. As a result, testers may more easily and better be able to determine the response of the NFTs 128/128/128'/128" for various laser powers. Further, the laser power at which plastic deformation occurs may also be determined. The results may be used to calibrate design parameters, material properties for the NFT, desired write current and other criteria used for the HAMR disk drive 100. In addition, the method 250 may be used for in-production screening of HAMR transducers. Thus, not only may the method 250 be easier to perform and result in more accurate measurements, but the method 250 may also be used in improving performance of the actual HAMR disk drive 100.

We claim:

1. A method for testing a heat assisted magnetic recording (HAMR) transducer, the HAMR transducer being optically coupled to at least one laser, having an air-bearing surface, and including at least one waveguide, at least one near-field transducer (NFT) and a pole, a portion of the at least one NFT residing at the ABS, the laser being optically coupled to the at least one NFT, the method comprising:

energizing the at least one laser with at least one power while the HAMR transducer is not in proximity to a media; and measuring an off-disk protrusion of the portion of the at least one NFT at the ABS while the at least one laser is energized with the at least one power and the HAMR transducer is not in proximity to the media.

2. The method of claim 1 further comprising:

determining an on-disk protrusion of the portion of the at least one NFT based on the off-disk protrusion and an operating power.

3. The method of claim 1 further comprising:

accounting for the media being in proximity to the ABS of the HAMR transducer.

4. A method for testing a heat assisted magnetic recording (HAMR) transducer, the HAMR transducer being optically coupled to at least one laser, having an air-bearing surface, and including at least one waveguide, at least one near-field transducer (NFT) and a pole, a portion of the at least one NFT residing at the ABS, the laser being optically coupled to the at least one NFT, the method comprising:

energizing the at least one laser with at least one power while the HAMR transducer is not in proximity to a media; and measuring an off-disk protrusion of the portion of the at least one NFT at the ABS while the at least one laser is energized with the at least one power and the HAMR transducer is not in proximity to the media, wherein the step of measuring the off-disk protrusion further includes:

measuring the off-disk protrusion using an atomic force microscope (AFM).

5. The method of claim 4 wherein the step of measuring the off-disk protrusion using an AFM further includes:

performing an intermediate measurement of a structure proximate to the NFT.

6. The method of claim 5 wherein the structure includes at least one of the waveguide and a pole.

7. The method of claim 1 further comprising:

measuring a baseline location of the portion of the at least one NFT while the laser is not energized; and wherein the step of measuring the off-disk protrusion further includes measuring an operational location and subtracting the baseline location from the operational location.

8. The method of claim 1 further comprising:

repeating the laser energizing and off-disk protrusion measuring steps for a plurality of laser powers.

9. A method for testing a heat assisted magnetic recording (HAMR) transducer, the HAMR transducer being optically coupled to at least one laser, having an air-bearing surface, and including at least one waveguide, at least one near-field transducer (NFT) and a pole, a portion of the at least one NFT residing at the ABS, the laser being optically coupled to the at least one NFT, the method comprising:

mounting the HAMR transducer in a measurement device;

measuring a baseline location of the portion of the at least one NFT using the measurement device while the at least one laser is not energized;

energizing the at least one laser after the step of measuring the NFT baseline location and while the HAMR transducer is in the measurement device; and measuring an operational location of the portion of the at least one NFT at the ABS while the at least one laser is energized using the measurement device;

determining an off-disk protrusion of the portion of the at least one NFT based on the baseline location and operational location.

10. The method of claim 9 further comprising:

accounting for the media being in proximity to the ABS of the HAMR transducer.

11. The method of claim 9 wherein the step of measuring the operational location using an AFM further includes:
   performing an intermediate measurement of a structure proximate to the NFT.

12. The method of claim 9 wherein the structure includes at least one of the waveguide and a pole.

13. The method of claim 9 further comprising
   repeating the laser energizing, operational location measuring, and off-disk protrusion determining and steps for a plurality of laser powers.

14. The method of claim 9 further comprising:
   reducing the laser energy to zero; after the step of measuring the operational location;
   measure an additional baseline location of the portion of the at least one NFT when the laser is not energized.

15. The method of claim 14 further comprising
   repeating the laser energizing, operational location measuring, and off-disk protrusion determining, laser energy reducing, additional baseline location measuring and comparing steps for a plurality of laser powers.

16. The method of claim 13 further comprising:
   comparing the baseline location to the additional baseline location.

\* \* \* \* \*